United States Patent [19]

Morgan

[11] Patent Number: 4,636,279
[45] Date of Patent: Jan. 13, 1987

[54] TAPE SPLICING MECHANISM

[76] Inventor: Scott J. Morgan, 45 King Street, Broseley, Shropshire TF12 5NA, England

[21] Appl. No.: 695,404

[22] PCT Filed: Jan. 18, 1982

[86] PCT No.: PCT/GB82/00011
§ 371 Date: Sep. 20, 1982
§ 102(e) Date: Sep. 20, 1982

[87] PCT Pub. No.: WO82/02613
PCT Pub. Date: Aug. 5, 1982

Related U.S. Application Data

[63] Continuation of Ser. No. 425,097, Sep. 20, 1982, abandoned.

[30] Foreign Application Priority Data

Jan. 20, 1981 [GB] United Kingdom ............... 8101661

[51] Int. Cl.4 ............................................. B31F 5/06
[52] U.S. Cl. ................................. 156/506; 156/157; 156/159; 156/517; 156/519; 156/572; 156/304.1
[58] Field of Search ................... 156/505–506, 156/517–518, 519–521, 572, 502, 157, 159, 304.1

[56] References Cited

U.S. PATENT DOCUMENTS

| | | | |
|---|---|---|---|
| 3,066,723 | 12/1962 | Remington et al. | 156/523 |
| 3,607,572 | 9/1971 | Jorgensen | 156/505 |
| 3,664,903 | 5/1972 | McCorkle | 156/519 X |
| 3,749,622 | 7/1973 | Sato et al. | 156/502 |
| 3,880,699 | 4/1975 | Nishimoto | 156/443 X |
| 4,019,948 | 4/1977 | Hudalla et al. | 156/519 |
| 4,025,384 | 5/1977 | Shiozaki et al. | 156/517 |
| 4,106,974 | 8/1978 | Hirsch | 156/507 |
| 4,204,898 | 5/1980 | King | 156/502 |
| 4,285,757 | 8/1981 | Mori | 156/505 |

Primary Examiner—Edward Kimlin
Assistant Examiner—Merrell C. Cashion
Attorney, Agent, or Firm—Larson and Taylor

[57] ABSTRACT

A tape splicing mechanism is disclosed which is particularly adapted for splicing leader tape to the magnetic tape of a video cassette. The tape splicing mechanism includes a holder for a reel of adhesive tape which is drawn off and fed past a splice transfer block (13) and a fixed block (8) to a splice transfer pad (11) at the end of an arm (15) on a carriage (16); the two blocks (8,13) and the pad (11) have faces with apertures acting as suction faces which act to hold a length of tape secured by a cutter in position during transfer; the carriage reciprocates parallel to the arm between a retracted position and an application position, at which latter the arm is pressed transverse its length by an applicator actuator (9) to press the length of adhesive tape, held on the pad (11) by the vacuum, against the tape to be spliced.

8 Claims, 2 Drawing Figures

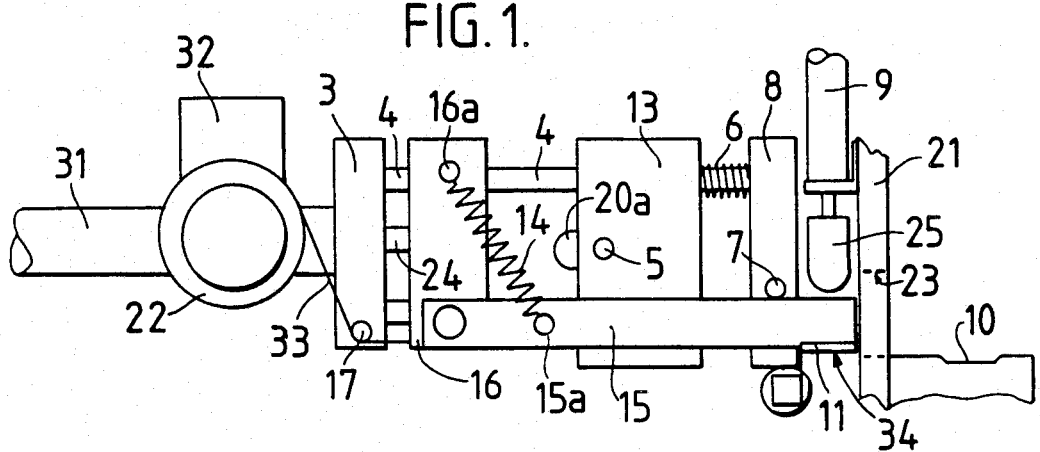
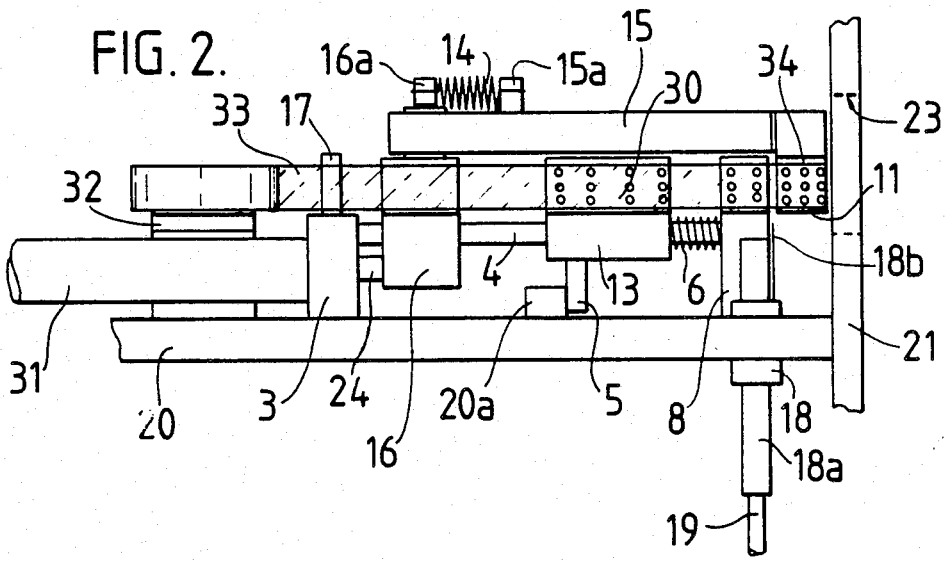

TAPE SPLICING MECHANISM

This application is a continuation of application Ser. No. 425,097, filed 9/20/82, now abandoned.

TECHNICAL FIELD

The present invention relates generally to a tape splicing mechanism suitable for applying splicing tape to a junction between two adjacent ends of tape to be spliced. Such splicing is effected for repairing magnetic recording tape when broken, for editing magnetic tape and for connecting such tape to leader tape when loading such tape onto a reel or into a cassette. The present invention particularly concerns a mechanism for splicing magnetic tape for video cassette recorders, but is adaptable and adjustable to form splices in tapes of any form and over a wide range of widths.

BACKGROUND ART

Conventional tape splicing equipment generally acts from one face of the tape to be spliced, by preparing a portion of splicing tape or web, and securing this across a junction between two adjacent ends of tape to be spliced. Usually, adhesive tape is employed for this purpose, that is tape having a layer of adhesive on one face thereof. Alternatively, however, other fixing methods may be applied, for example the splicing tape may be attached to the tape to be spliced by friction welding, resistance heating or other fusion techniques.

One disadvantage of the known tape splicing mechanism is that if the tape to be spliced is in a loop it is necessary sometimes to displace the upper part of the loop in order to gain access to the joint. With wide tapes such as are used in video cassette recorders this leads to the possibility of creasing which has substantial disadvantages.

In prior art mechanisms where self adhesive tape has been used this has been guided over a roller system and the adhesive used for ensuring retention of the adhesive tape to its intended path. Such contact between the adhesive side of the splicing tape and the roller feed mechanism increases the frictional resistance which must be overcome in operation and can cause clogging and malfunction problems.

The object of the present invention is to provide a tape splicing mechanism which is fully automatic, and which can act from one side of the tape to apply splicing tape from a laterally displaced position so that the region immediately above the tape is not obstructed.

DISCLOSURE OF INVENTION

By the present invention there is provided a tape splicing mechanism for joining two free ends of tape to be joined by applying an element of splicing tape over the said two free ends of tape to be joined, characterised in that the mechanism includes means for severing an end portion of splicing tape from a standing length thereof drawn from a source of tape supply, and means for retaining the severed portion, the said retaining means being displaceable in a direction generally parallel to the plane of the severed porton of the tape to transfer it to an application position, and means for effecting application of the said severed portion of splicing tape to a tape to be spliced.

The actual application of the splicing tape to the tape to be spliced may be effected in one of a number of ways. Perhaps the most convenient of these is the use of self-adhesive tape.

In embodiments of the present invention self-adhesive splicing tape can be utilised without the adhesive side of the tape coming into contact with any part of the mechanism on its path from a supply roll to the application position. To achieve this the severed portion retention means preferably acts to retain the said severed portion of splicing tape by suction.

To facilitate the automatic operation of the mechanism it is preferred that the standing length of splicing tape is advanced from the source of supply automatically in a phased relation with the transfer of the severed portion of splicing tape to the said application position. This transfer of the severed portion to the application position can be parallel to the standing length of tape or at an angle to this length, for example at right angles to it, but in the preferred embodiment of the invention the direction of displacement is parallel to the standing length of splicing tape.

Preferably the standing length of splicing tape is advanced from the source of supply simultaneously with the displacement of the severed portion of the splicing tape to the application position. This allows a simplification in the actuator mechanism which drives the splicer. In a preferred embodiment of the invention the said splicing tape severed portion retaining means include an applicator arm pivotally mounted at one end to a reciprocable applicator carriage and provided at the opposite end with means for retaining the severed portion of splicing tape. In order to retain the severed portion of splicing tape at the said opposite end of the applicator arm by suction this latter is preferably provided with a vacuum surface having a plurality of openings communicating with internal passages within the applicator arm and leading to a vacuum pump via a suitable control valve.

The applicator carriage on which the applicator arm is mounted is preferably reciprocable along a rectilinear path guided by suitable rectilinear guides extending parallel to the said standing length of splicing tape. Movement of the applicator carriage is preferably effected by means of a linear fluid pressure actuator and in view of the forces and response times involved a pneumatic actuator is preferred.

The applicator carriage is displaceable along the guides from a first or retracted position to a second or extended position in which latter position it may be acted on by pressure-exerting means which urge it to turn about its pivoted end so that the applicator end is pressed into contact with a suitable reaction surface at the application station. The reaction surface may be a fixed bed on which the splicing is to take place.

The splicing mechanism of the present invention is particularly suitable for use in connection with an automatic tape cassette loading machine described in my copending British Patent Application No. 8101660 filed Jan. 20, 1980, in which case the reaction surface would be constituted by the fixed and movable vacuum blocks more particularly described in that Specification.

The means for advancing the standing length of splicing tape preferably includes two vacuum actuated tape gripper devices, one fixed in position adjacent the free end of the applicator arm when this is in its retracted position, and one movable between a first and a second position, the location of the said first position being adjustable whereby to adjust the stroke of the advance. In the preferred embodiment of the invention the splicing tape advancing mechanism is so positioned that it can be contacted by the tape applicator carriage as this is advanced, whereby to effect displacement of the advancing mechanism between its first and second positions.

A preferred embodiment of the present invention will now be more particularly described, by way of example, with reference to the accompanying drawings, in which:

BRIEF DESCRIPTION OF DRAWINGS

FIG. 1 is a schematic side view of the embodiment; and

FIG. 2 is a plan view from below of the embodiment of FIG. 1.

BEST MODE FOR CARRYING OUT THE INVENTION

Referring now to the drawings the splicing mechanism is supported on a back plate 20 and a face plate 21 in which is formed an aperture 23. Extending parallel to the machine back plate 20 is a guide rod 4 which is supported by two support blocks 3 and 8 themselves carried by the machine back plate 20. Between the two support blocks 3 and 8, and slidable along the guide rod 4 there are mounted an applicator carriage 16 and a splice transfer block 13 the functions of which will be explained in greater detail below.

Pivotally secured on the applicator carriage 16 is an applicator arm 15 which is biased in an anti-clockwise direction by a spring 14 extending between a pin 15a on the applicator arm 15 and a pin 16a on the applicator carriage 16. The applicator carriage 16 is secured to one end of an actuator arm 24 of a linear fluid pressure actuator 31 which is secured in position by means (not shown) closely abutting the support block 3. Extension and retraction of the actuator 31 causes reciprocating movement of the applicator carriage 16 and corresponding linear movement, parallel to its length, of the applicator arm 15 between the position shown in FIG. 1 where the free end of the applicator arm is located just to the left of the machine face plate 21, and an extended position in which the free end of the applicator arm 15 projects through the aperture 23 in the face plate 21.

Located adjacent to the aperture 23 is a reaction bed 10 which, as mentioned above, may be a fixed block or may be constituted by a part of a cassette winding mechanism when the splicing mechanism of the present invention is utilised in a cassette winder as described in my copending British Patent Application No. 81.01660 filed Jan. 20, 1981.

An abutment stop 7 carried on the fixed block 8 limits the anti-clockwise rotation of the applicator arm 15 and clockwise movements of the arm can be effected by means of a pressure actuator 9 having a bearing block 25 which is lowered into contact with the applicator arm 15 upon extension of the actuator 9.

Also mounted on the machine back plate 20 is a tape holder 32 carrying a reel 22 of adhesive tape 33 which is to be used as the splicing tape. Adhesive tape 33 from the reel 22 passes over a tape guide roller 17 carried by the fixed block 3, with the adhesive side of the tape 33 facing outwardly so as not to come into contact with the roller 17. From the roller 17 the standing length of tape 33 passes under the applicator carriage 16, beneath the transfer block 13 and the fixed block 8, and terminates underneath the free end of the applicator arm 15. At this free end the applicator arm 15 is provided with an applicator pad 11 having a surface formed with a plurality of openings communicating with internal passages within the applicator arm 15 leading to a vacuum pump (not shown). In use of the apparatus the vacuum pump is connected to the passages leading to the openings in the vacuum surface of the applicator pad 11 via a suitable distributor valve (not shown) which may be a spool valve or other kind of valve suitable for this purpose. The fixed block 8, like the applicator pad 11 has a vacuum surface, that is a surface provided with a plurality of openings communicating with passageways within the fixed block 8 leading to a vacuum pump which, conveniently, is the same vacuum pump as that which supplies the applicator pad 11.

The transfer block 13, like the applicator pad 11 and the fixed block 8, has a vacuum surface 30 over which the tape passes, this surface, too, having a plurality of openings communicating with internal passages within the block leading via a control valve to a vacuum source such as a vacuum pump which, again, may be the same vacuum pump as that serving the vacuum surfaces on the applicator pad 11 and the fixed block 8. The transfer block 13 has a laterally projecting stop pin 5 which in the position illustrated in FIGS. 1 and 2 engages an adjustable abutment 20a secured to the back plate 20. The transfer block 13 is biased to the left of FIG. 1 by a spring 6 surrounding the guide rod 4 and acting between the transfer block 13 and the fixed block 8.

Also supported by the fixed block 8 is a cylindrical bush 18 through which passes a shaft 18a carrying a cutter blade 18b at one end thereof. The other end of the shaft 18a is attached to the movable arm of a linear pneumatic actuator 19 which acts to drive the shaft 18a between an advanced and a retracted position, in which latter position it is illustrated in FIG. 2, whereby to introduce the cutter blade 18b into the gap between the applicator pad 11 and the fixed support block 8 to sever the leading end portion 34 of the tape held by suction to the applicator pad 11.

When setting up the machine a reel 22 of splicing tape 33 is fitted onto the tape reel holder 32 and the tape 33 itself threaded through the machine along the path illustrated in the drawings, that is passing around the tape roller 17 and under the applicator carriage 16 to pass the vacuum face 30 of the transfer block 13, the vacuum face of the fixed support block 8 and the vacuum face of the applicator pad 11.

The machine described above operates as follows: with the tape 33 in position as shown in the drawings a vacuum is applied to the transfer block 13, the fixed block 8 and the applicator pad 11. The actuator 19 is then advanced to cause the cutter blade 18b to sever the leading end portion 34 of the tape, and when this is completed the actuator 19 is retracted and the actuator 31 caused to extend displacing the applicator carriage 16 and the applicator arm 15 to the right as viewed in the drawings. Extension of the actuator 31 continues until the applicator pad is located over the application station of the reaction block 10, which is indicated in FIG. 1 by a shallow recess. Before the applicator arm reaches this position, however, the applicator carriage 16 abuts against the transfer block 13 and causes this to be displaced, with the applicator carriage 16 against the reaction of the compression spring 6.

Prior to extension of the actuator 31 the distributor valve controlling the application of vacuum to the fixed block 8 is operated to shut off the vacuum to the fixed block 8 leaving the vacuum applied, however, to the applicator pad 11 and the transfer block 13. Displacement of the transfer block 13 causes the tape to be advanced by the same amount as the distance travelled by the transfer block 13 between its point of contact with the applicator carriage 16 and the end of travel determined when it abuts the fixed block 8. The length of this stroke is adjustable by adjusting the abutment 25 which determines the position occupied by the transfer block 13 when it is engaged by the applicator carriage 16 to commence its displacement. The adhesive tape 33 has sufficient stiffness for the end projecting beyond the transfer carriage 13 not to fold significantly.

When the transfer block 13 abuts the fixed block 8 the applicator arm 15 is in its fully extended position and the actuator 9 is then advanced to cause the bearing block 25 to press down on the applicator arm 15, causing it to rotate clockwise about its pivotal connection to the applicator carriage 16 pressing the applicator pad 11 down onto the tape in the channel of the reaction block 10 completing the splice to be made there. Following this the actuator 9 is retracted and the vacuum removed from the applicator pad 11 allowing the arm 15 to turn in an anti-clockwise direction back to its original position where it is held by a back-stop pin 7 carried by the fixed block 8. Simultaneous with the removal of vacuum from the applicator pad 11 the vacuum to the active surface of the fixed block 8 is re-applied and the vacuum to the transfer block 13 is removed by operation of the controlling distributor valve (not shown) which may be controlled by micro switches, operated by abutments as the mechanism moves, or by a control timer. The tape leading end is now held by the fixed block 8 and the main applicator actuator 31 is caused to retract withdrawing the applicator carriage 16 and the applicator arm 15, which elements move relatively to the tape due to the fact that the vacuum is no longer applied to the applicator pad 11 or the transfer block 13. This latter is returned by the spring 6 to its original position determined by the setting of the abutment 25 which is engaged by the stop pin 5. At completion of the retraction of the actuator 31 vacuum is again applied to the applicator pad 11 and the transfer block 13 and the cycle recommences with energisation of the actuator 19 to cut the next leading end portion of tape ready for a new splice.

If it is desired to splice narrower or wider tape in the channel of the reaction block 10 this can be readily accommodated by suitable adjustment of the abutment 25 which determines the amount of tape advanced at each stroke, and correspondingly the effective width of the splicing portion 34 of tape.

I claim:

1. In a tape splicing mechanism for joining two free end portions of tape to be joined in abutting end-to-end relationship at a joining station by applying an element of adhesive splicing tape from a source of supply thereof over said two free end portions of said tape to be joined at said joining station, improved means for feeding and cutting to length and controlling the position of the adhesive splicing tape, said means comprising a linearly reciprocable splicing tape advancing means for drawing a standing length of said splicing tape from said source of supply thereof, with said standing length extending transversely of the length of said two free end portions of tape to be joined at said joining station and closely adjacent the plane defined thereby, splicing tape severing means operating to sever an end portion of said splicing tape at the end of said standing length thereof, splicing tape severed end retaining means for retaining by suction said severed end portion of splicing tape severed by the operation of said splicing tape severing means in substantially the same plane as that in which said standing length of splicing tape lies, means for displacing said severed end retaining means linearly towards and away from said joining station in a direction generally parallel to said standing length of said splicing tape whereby to transfer said severed end portion of splicing tape to said joining station by moving it parallel to the plane defined by said two free end portions of tape to be joined, and applicator pressing means for applying said severed end portion of splicing tape onto said abutting free end portions of said tape to be joined by pressing splicing tape severed end retaining means carrying said severed end portion of splicing tape onto said free end portions of said tape to be joined to join said free end portions together, said means for displacing said splicing tape severed end retaining means also acting to displace said splicing tape advancing means a different distance than said splicing tape severed end retaining means.

2. The tape splicing mechanism of claim 1, wherein said splicing tape advancing means operates in phased relation with said splicing tape severed end retaining means whereby said standing length of splicing tape is advanced from said source of supply thereof simultaneously with the displacement of said severed end portion of splicing tape to said application position.

3. The tape splicing mechanism of claim 1, wherein said splicing tape severed end retaining means comprises an applicator arm pivotally mounted at one end to a reciprocable applicator carriage; said applicator arm being provided at the opposite end with suction pad means for retaining said severed end portion of splicing tape, said applicator carriage being linearly reciprocable along rectilinear guides extending parallel to said standing length of splicing tape.

4. The tape splicing mechanism of claim 3, wherein said linear displacement device for said applicator carriage is a linear fluid pressure actuator.

5. The tape splicing mechanism of claim 1, wherein said splicing tape advancing means includes two vacuum actuated tape gripper devices, one being fixed in position adjacent the free end of said applicator arm when this is in its retracted position, and the other being movable between a first and a second position, means for adjusting the location of said first position along the direction of movement of said splicing tape advancing means whereby to adjust the stroke of advance of said splicing tape independently of the movement of said splicing tape severed end retaining means also displaced by the same displacement device.

6. The tape splicing mechanism of claim 3, wherein said applicator carriage is displaceable along said guides from a first or retracted position to a second or extended position and said applicator pressing means act on said applicator arm when said carriage is in said second position thereof to urge it to turn about said pivoted end thereof so that said applicator end is pressed against a reaction surface at said joining station.

7. The tape splicing mechanism of claim 6, wherein said reaction surface is a fixed bed on which said splicing operation is performed.

8. The tape splicing mechanism of claim 2, wherein said splicing tape advancing means is positioned so that it can be contacted by said splicing tape severed end retaining means as the latter advances, whereby to effect displacement of said tape advancing mechanism from said first to said second position.

* * * * *